(12) United States Patent
Denman et al.

(10) Patent No.: US 10,082,077 B2
(45) Date of Patent: Sep. 25, 2018

(54) GAS TURBINE LUBRICATION SYSTEMS

(71) Applicant: UNITED TECHNOLOGIES CORPORATION, Farmington, CT (US)

(72) Inventors: James H. Denman, West Hartford, CT (US); Julie Henion, Woburn, MA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 332 days.

(21) Appl. No.: 15/024,506

(22) PCT Filed: Oct. 1, 2014

(86) PCT No.: PCT/US2014/058592
§ 371 (c)(1),
(2) Date: Mar. 24, 2016

(87) PCT Pub. No.: WO2015/061011
PCT Pub. Date: Apr. 30, 2015

(65) Prior Publication Data
US 2016/0237899 A1 Aug. 18, 2016

Related U.S. Application Data

(60) Provisional application No. 61/895,105, filed on Oct. 24, 2013.

(51) Int. Cl.
*F02C 7/06* (2006.01)
*F01D 25/20* (2006.01)
(Continued)

(52) U.S. Cl.
CPC .............. *F02C 7/06* (2013.01); *F01D 25/183* (2013.01); *F01D 25/20* (2013.01); *F01M 1/16* (2013.01);
(Continued)

(58) Field of Classification Search
CPC .......... F02C 7/06; F01D 25/20; F01D 25/183; F01D 2220/32
(Continued)

(56) References Cited

U.S. PATENT DOCUMENTS 4,452,037 A * 6/1984 Waddington ............ F01D 25/18
184/6.11
4,465,427 A * 8/1984 Libertini ................. F01D 25/18
384/398
(Continued)

FOREIGN PATENT DOCUMENTS

EP 0884478 A1 12/1998
EP 1698762 A2 9/2006
(Continued)

OTHER PUBLICATIONS

English Abstract for EP0884478A1—Dec. 16, 1998; 2 pgs.
(Continued)

*Primary Examiner* — Timothy L Maust
(74) *Attorney, Agent, or Firm* — Cantor Colburn LLP (57) ABSTRACT

A lubrication circuit for a gas turbine engine includes a bearing compartment, an air inlet connected to the bearing compartment, a lubricant inlet, and a lubricant outlet. The air inlet fluidly connects the bearing compartment to an environment external to the compartment. The lubricant inlet and outlet are connected to the bearing compartment. A scavenge valve is operatively connected between the lubricant outlet and a scavenge pump that is responsive to bearing compartment pressure for controlling pressure drop across the air inlet.

19 Claims, 5 Drawing Sheets

(51) Int. Cl.
  F01D 25/18 (2006.01)
  F01M 1/16 (2006.01)
(52) U.S. Cl.
  CPC ...... *F05D 2220/32* (2013.01); *F05D 2260/98* (2013.01); *F05D 2270/20* (2013.01)
(58) Field of Classification Search
  USPC ........................................................ 415/112
  See application file for complete search history.

(56) References Cited

U.S. PATENT DOCUMENTS

| | | | | |
|---|---|---|---|---|
| 4,531,358 A * | 7/1985 | Smith | ...................... | F01D 25/20 184/6.11 |
| 5,067,454 A * | 11/1991 | Waddington | ............ | F01D 25/20 123/196 AB |
| 5,421,702 A * | 6/1995 | Revak | ...................... | F01D 25/20 184/6.28 |
| 6,438,938 B1 * | 8/2002 | Burkholder | ............. | F01D 9/065 184/6.11 |
| 6,516,618 B1 * | 2/2003 | Bock | ........................ | F01D 25/16 60/39.08 |
| 7,225,626 B2 * | 6/2007 | Robinson | .............. | F01D 25/125 184/6.11 |
| 8,215,895 B2 * | 7/2012 | Henry | ...................... | F01D 9/065 415/1 |
| 8,245,818 B2 * | 8/2012 | Alecu | ...................... | F01D 25/18 123/572 |
| 8,257,024 B1 * | 9/2012 | Phillips | ................... | F01D 25/18 184/104.1 |
| 2006/0054404 A1 * | 3/2006 | El-Ibiary | ............. | F16C 33/1085 184/6 |
| 2006/0260323 A1 * | 11/2006 | Moulebhar | ........... | F01D 21/003 60/793 |
| 2007/0289310 A1 * | 12/2007 | Dooley | ................... | F01D 15/10 60/773 |
| 2010/0028127 A1 * | 2/2010 | Cornet | .................... | F01D 11/04 415/1 |
| 2016/0305284 A1 * | 10/2016 | Mastro | .................... | F01D 25/20 |

FOREIGN PATENT DOCUMENTS

| | | |
|---|---|---|
| EP | 2071140 A2 | 6/2009 |
| EP | 2258929 A2 | 12/2010 |
| EP | 2584171 A2 | 4/2013 |

OTHER PUBLICATIONS

PCT International Search Report for International Application No. PCT/US2014/058592; International Filing Date: Oct. 1, 2014; dated Jan. 12, 2015; 5 pgs.

PCT Written Opinion for International Application No. PCT/US2014/058592; International Filing Date: Oct. 1, 2014; dated Jan. 12, 2015; 4 pgs.

European Search Report for Application No. EP 14 85 5369.

* cited by examiner

GAS TURBINE LUBRICATION SYSTEMS

RELATED APPLICATIONS

This application claims the benefit of and priority to U.S. Provisional Patent Application No. 61/895,105 filed Oct. 24, 2013, the contents of which are incorporated herein by reference in their entirety.

BACKGROUND OF THE INVENTION

1. Field of the Invention

The present disclosure relates to lubrication systems, and more particularly to lubricant scavenging systems for gas turbine engines.

2. Description of Related Art

Conventional gas turbine engines typically include a low pressure spool (including a low pressure compressor and a low pressure turbine coupled by a low pressure shaft) and a high pressure spool (including a high pressure compressor and a high pressure turbine coupled by a high pressure shaft). Some gas turbine engines include separate fan disc shaft coupled to the low speed shaft by a gearbox for rotating the fan disc at a different speed than the low pressure spool. The shafts are rotatably supported by bearings housed in bearing compartments where contacting portions of the shafts and bearings are lubricated and cooled by a flow of lubricating liquid transiting the bearings. After transiting the bearings, lubricant exits the bearing compartment through a scavenging system for filtering and cooling before being returned to the bearing compartment.

Shaft seals bounding the bearing compartment couple the shaft to the bearing compartment. This seals the bearing compartment from the environment external to the compartment, confining lubricant to the bearing compartment interior, at the expense of parasitic losses such as from friction between the shaft seal and shaft surface. The amount of parasitic loss is a function of differential pressure across the shaft seals. Differential pressure in turn depends on the pressure within the bearing compartment in comparison to pressure on the shaft seal exterior. Since the exterior pressure can change during engine operation, e.g. increasing with shaft speed for example, parasitic losses typically increase in conventional gas turbine engine architectures with shaft speed.

Conventional gas turbine engine lubrication systems have generally been satisfactory for their intended purpose. However, there is a need for gas turbine engines with improved engine efficiency, such as through reduced parasitic loss from at interfaces between rotating components and shaft seals at high rotor speeds. The present disclosure provides solutions to these needs.

SUMMARY OF THE INVENTION

A lubrication circuit for a gas turbine engine includes a bearing compartment, an air inlet connected to the bearing compartment, a lubricant inlet, and a lubricant outlet. The air inlet fluidly connects the bearing compartment to an environment external to the compartment. The lubricant inlet and outlet are connected to the bearing compartment. A scavenge valve is operatively connected between the lubricant outlet and a scavenge pump that is responsive to bearing compartment pressure for controlling pressure drop across the air inlet.

In certain embodiments, the scavenge valve can include a movable valve member for reducing fluid flow through the scavenge valve. The valve member can be movable between restricted and unrestricted positions in response to differential pressure between the bearing compartment and the bearing compartment external environment. Lubricant flow through the scavenge valve can be about the same in both the restricted and unrestricted positions.

In accordance with certain embodiments, the scavenge valve can be a continuously variable scavenge valve with a valve member for restricting fluid flow through the scavenge valve in response to differential pressure between the bearing compartment interior and the environment external to the bearing compartment. The valve member can be movable between first and second restricted positions, flow restriction being greater at the first restricted position than the second restricted position.

It is contemplated that the lubrication circuit can include a pressure sensor connected between the bearing compartment and the scavenge valve. The scavenge valve can include a mechanical regulator operatively connected to the scavenge valve for controlling restriction in response to differential pressure between the bearing compartment interior and the bearing compartment external environment. A control module can be connected to the pressure sensor and the scavenge valve for varying scavenge valve restriction based on sensed pressure. The control module can be tuned over a range of shaft speed to adjust restriction based on sensed pressure.

It is further contemplated that the air inlet can be a shaft seal bounding the bearing compartment and separating the bearing compartment interior from the environment external to the bearing compartment. A spool can be rotatably supported by a bearing body disposed within the bearing compartment and having a rotatable portion sealably engaged by the shaft seal. The spool can also be mechanically connected to the scavenge pump for driving the scavenge pump such that air flow through the air inlet is a function of rotational speed of the spool.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
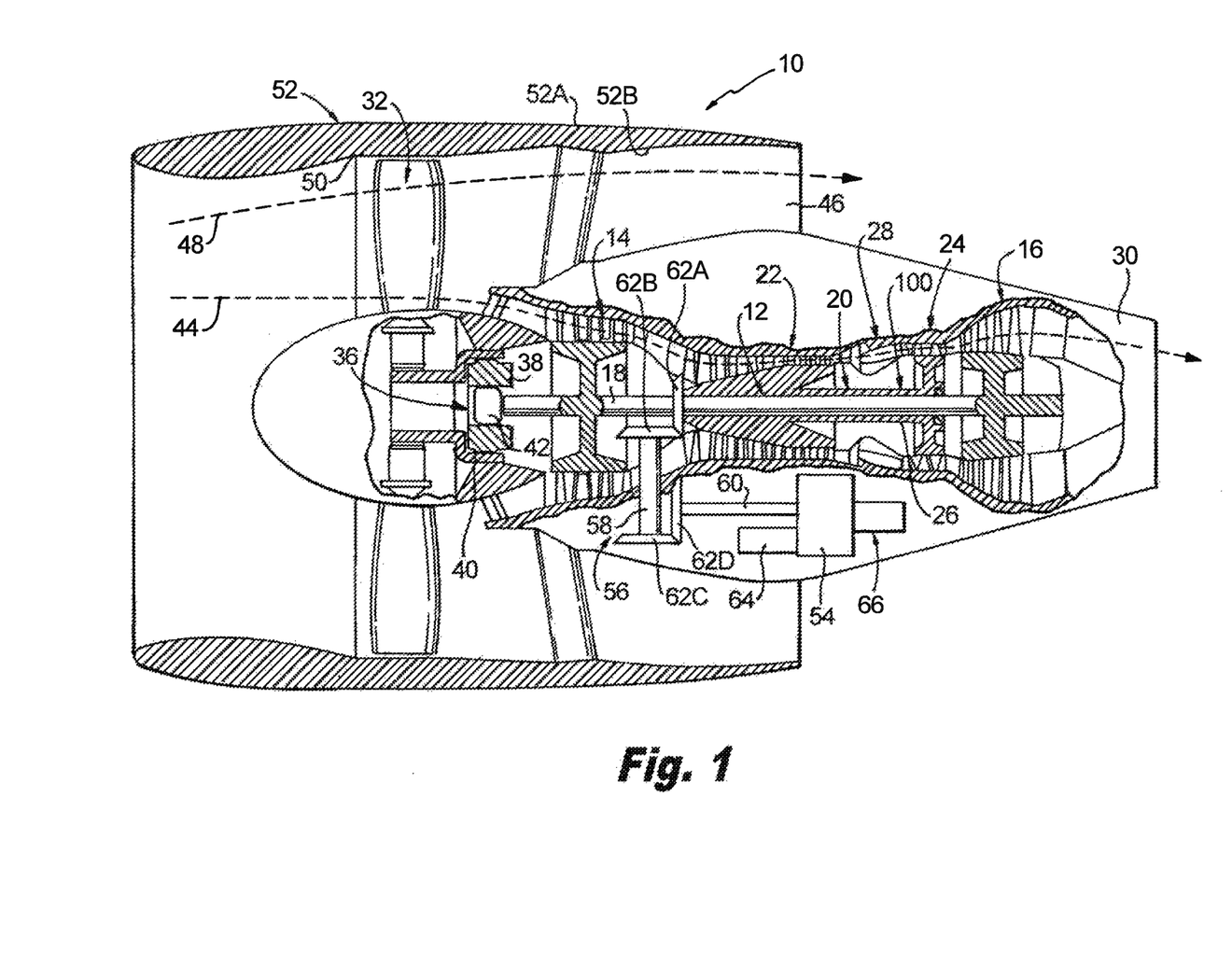
FIG. 1 is a schematic cross-sectional side view of view of an exemplary embodiment of a gas turbine constructed in accordance with the present disclosure, showing a lubrication system.

Reference will now be made to the drawings wherein like reference numerals identify similar structural features or aspects of the subject disclosure. For purposes of explanation and illustration, and not limitation, a partial view of an exemplary embodiment of a lubrication system in accordance with the disclosure is shown in FIG. 1 and is designated generally by reference character 100. Other embodiments of lubrication system in accordance with the disclosure, or aspects thereof, are provided in FIGS. 2-5C, as will be described. The systems and methods described herein can be used in gas turbine engines, such as turbofan aircraft engines for example.

With reference to FIG. 1, a gas turbine engine 10 is shown. Gas turbine engine 10 is a turbofan engine and includes a low-pressure spool 12 and a high-pressure spool 20. Low-pressure spool 12 includes a low-pressure compressor 14 and a low-pressure turbine 16 connected by a low-pressure shaft 18. High-pressure spool 20 includes a high-pressure compressor 22 and a high-pressure turbine 24 connected by a high-pressure shaft 26. Gas turbine 10 also includes a combustor 28, a core cowling 30, a fan 32, and a fan shaft 34. As illustrated, gas turbine 10 low-pressure spool 12 is coupled to fan shaft 34 via a fan drive gear system 36 which includes a star gear 38, a ring gear 40, and a sun gear 42. Sun gear 42 is attached to and rotates with low-pressure shaft 18. Ring gear 40 is rigidly connected to fan shaft 34 which turns at the same speed as fan 32. Star gear 38 is coupled between sun gear 42 and ring gear 40 such that star gar 38 revolves around sun gear 42 about which ring gear 40 rotates. When low-pressure spool 12 rotates, fan drive gear system 36 causes fan shaft 34 to rotate at a slower rotational velocity than that of low-pressure spool 12. In alternative embodiments, fan 32 can be connected to low-pressure spool 12 in a manner other than by fan drive gear system 36.

Air flows from fan 32, through low-pressure compressor 14, high-pressure compressor 22, combustor 28, high-pressure turbine 24, and low-pressure turbine along a main flow path 44. Air also flows from fan 32 through a fan bypass duct 46 along a bypass flow path 48. Fan bypass duct 46 is bounded at its inner diameter by core cowling 30 and at its outer diameter by a fan case 50. Fan nacelle 52 has a radially outer surface 52A and a radially inner surface 52B. Fan nacelle 52 is positioned on fan case 50, with fan case 50 being part of radially inner surface 52B.

A main accessory gearbox 54 is connected to high-pressure spool 20 via a gear system 56. Gear system 56 includes a tower shaft 58, a lay shaft 60, and bevel gears 62A-62D. Bevel gear 62A is fixedly connected to high-pressure shaft 26. Bevel gears 62B and 62C are fixedly connected at opposite ends of tower shaft 58. Bevel gear 62D is fixedly connected to lay shaft 60. Bevel gear 62A is coupled to bevel gear 62B and bevel gear 62C is coupled to bevel gear 62D such that high-pressure shaft 20 drives main accessory gearbox 54 when high-pressure spool 20 rotates.

Figure 2:
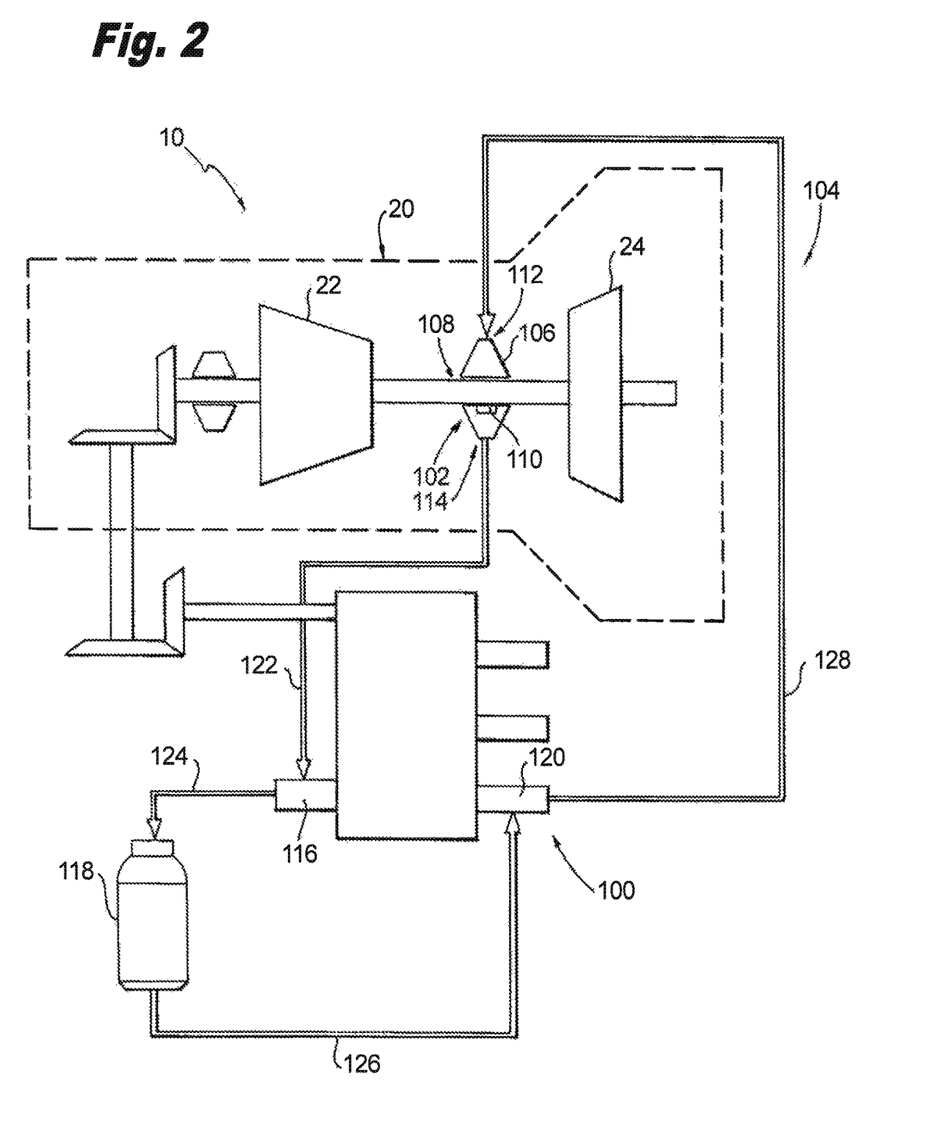
FIG. 2 is a schematic diagram of the engine of FIG. 1, showing a lubrication circuit.

With reference to FIG. 2, a schematic side view of a portion of gas turbine engine 10 is shown. Gas turbine engine 10 includes lubrication system 100. Lubrication system 100 is connected to high-pressure spool 20. Lubrication system 100 will be described in the context of a single bearing body associated with high-pressure spool 20. As will be appreciated by those skilled in the art, lubrication system 100 is configured and adapted for supplying a flow of lubricating liquid to one or more bearing bodies associated with one or more rotating bodies connected to low-pressure spool 12, high-pressure spool 20, fan drive gear system 36 or other rotating engine component.

Lubrication system 100 includes a bearing compartment 102 and a lubrication circuit 104. Bearing compartment 102 includes a compartment housing 106, a shaft seal 108, a fixed bearing body 110, a lubricant inlet 112, and a lubricant outlet 114. Shaft seal 108 is seated within a wall of housing 106 and disposed about high-speed shaft 26 and defines a portion of the boundary of bearing compartment 102. Shaft seal 108 is configured and adapted to restrict air flow across seal 108 into and out of the interior of bearing compartment 102, and includes one or more of either or both contacting and non-contacting sealing bodies. High-speed shaft 26 extends through shaft seal 108 such that at least a portion of high-speed shaft 26 is disposed within bearing compartment 102. Bearing body 110 is disposed within bearing compartment 102 and rotatably supports high-speed shaft 26. Lubricant inlet and lubricant outlet 112 and 114 are connected to bearing compartment 102 and are configured and adapted to respectively place the interior of bearing compartment 102 in fluid communication with lubrication circuit 104.

Lubrication circuit 104 includes a plurality of lubricant passages, a lubricant scavenge pump 116, a lubricant reservoir 118, and a lubricant supply pump 120. A scavenge passage 122 fluidly couples lubricant outlet 114 with scavenge pump 116. A scavenge pump discharge passage 124 fluidly couples scavenge pump 116 with lubricant reservoir 118. A lubricant supply passage 126 fluidly couples lubricant reservoir 118 with lubricant supply pump 120. A supply pump discharge passage 128 fluidly couples lubricant supply pump 120 with lubricant inlet 112. As will be appreciated by those skilled in the art, lubrication circuit 104 also includes other elements such as one or more lubricant filters, vent air de-oilers, and heat exchangers as suitable for a given engine application.

Lubrication system 100 irrigates bearing body 110 with a supply of lubricant during engine operation for purposes of lubricating contacting surfaces and removing heat from bearing compartment 102. Lubricant supply pump 120 draws lubricating liquid from lubricant reservoir 118 through lubricant supply passage 126 and supplies it to bearing compartment 102 through passage supply pump discharge passage 128 and lubricant inlet 112. Lubricant scavenging pump 116 draws, i.e. scavenges, lubricant from bearing compartment 102 by providing negative pressure to lubricant outlet 114 through scavenge passage 122, thereby drawing heated lubricant from a sump arranged in a lower portion of bearing compartment 102 after the lubricant has traversed bearing body 110.

Since scavenge pump 116 is mechanically connected to high-pressure spool 20 through accessory gearbox 54 through a fixed ratio gear drive system, e.g. tower shaft 58, lay shaft 60 and bevel gears 62A-62D, the amount of negative pressure applied to lubricant outlet 114 is a function of the rotation speed of high-speed spool 20. High-pressure spool 20 in turn rotates at different speeds depending upon engine power setting, progressively higher engine power settings corresponding to progressively higher shaft rotation speeds. As a consequence, higher engine power settings induce greater negative pressure at lubricant outlet 114, thereby causing greater pressure differentials between the interior of bearing compartment 102 and the environment external to bearing compartment 102. Since parasitic losses associated with shaft seal 108 are in part a function of differential pressure, increased engine power settings (and shaft speed) are therefore typically accompanied by increased parasitic losses in conventional gas turbine engines.

Figure 3A:
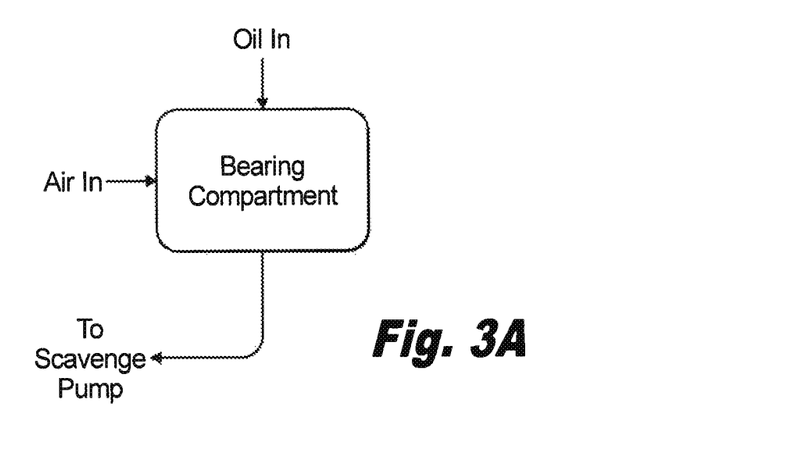
FIG. 3A is a schematic view of a conventional lubricant scavenging system for a gas turbine engine, showing system elements.
Figure 3B:
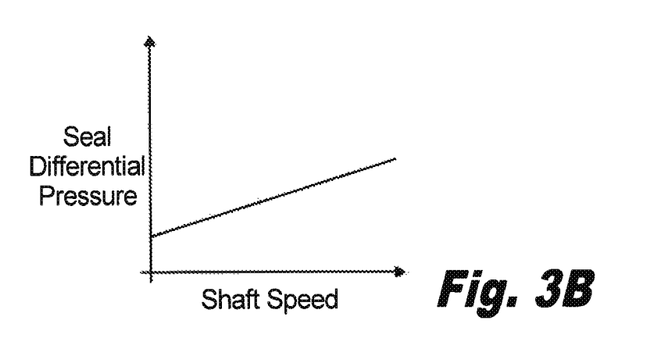
FIGS. 3B and 3C are graphs of seal differential pressure and parasitic loss as a function of rotor speed for the system of FIG. 3A, showing strong correlation between each of differential pressure and parasitic loss and shaft speed, respectively.
Figure 3C:
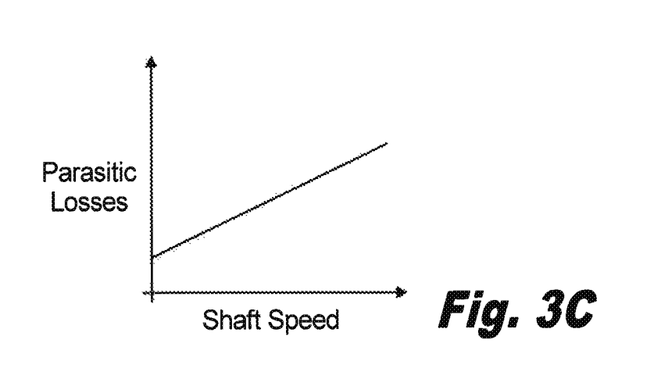

With reference to FIG. 3A, a conventional bearing chamber is shown. Lubricant, e.g. oil, enters the bearing chamber and is drawn out of the bearing chamber by a scavenge pump. The scavenge pump draws fluid from the bearing compartment, the fluid including larger amounts of air at high engine speeds. This causes increased air flow across shaft seals as indicated by the illustrated air inflow flow arrow. With reference to FIG. 3B and FIG. 3C, increasing shaft speed (rotor speed) is associated with respective increased seal differential pressure and parasitic losses. Parasitic loss is well correlated to seal differential pressure over the illustrated range of shaft speed. Parasitic loss and seal differential pressure are also each well correlated to shaft speed over the illustrated range.

Figure 4A:
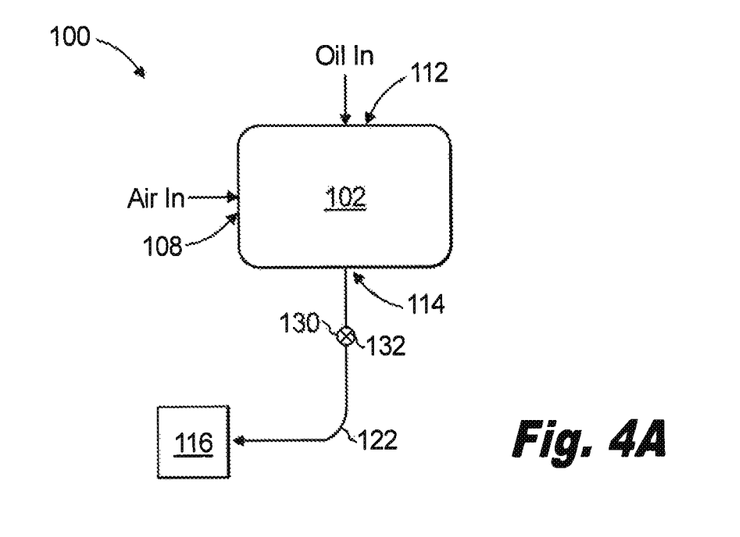
FIG. 4A is a schematic side view of an embodiment of a lubricant scavenging system in accordance with the present disclosure, showing a discretely variable scavenging valve.
Figure 4B:
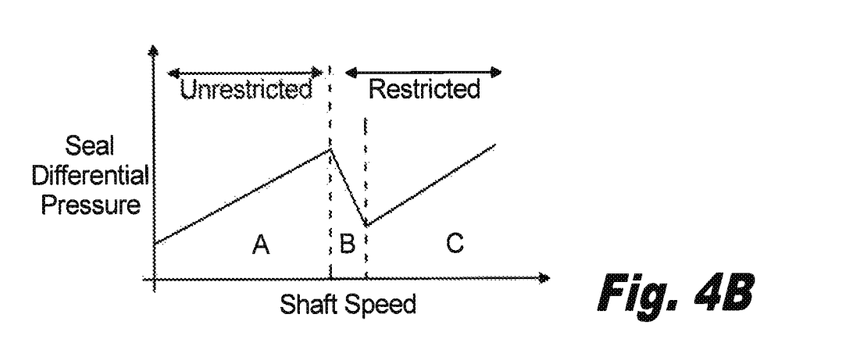
FIGS. 4B and 4C are graphs of seal differential pressure and parasitic loss versus shaft speed for the system of FIG. 4A, showing speed rage of inverse correlation between each of differential pressure and parasitic loss and shaft speed, respectively.
Figure 4C:
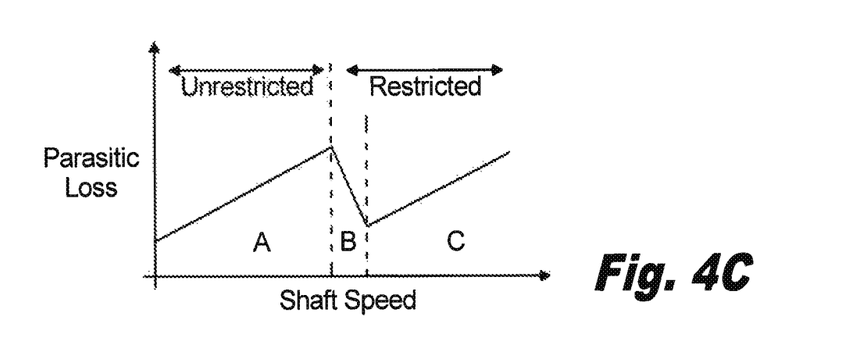

With reference to FIG. 4A, lubrication system 100 including bearing chamber 102 is shown. Lubrication system 100 includes a scavenging valve 130. Scavenging valve 130 is arranged in scavenge passage 122 between lubricant outlet 114 and lubricant scavenge pump 116. Scavenge valve 130 has a valve member 132 movable between at least a restricted and an unrestricted position. Valve member 132 is a discrete position valve member, occupying one or the other of at least two positions. In its unrestricted position, valve member 132 allows unrestricted fluid flow through scavenge passage 122. In its restricted position, valve member 132 restricts (limits) fluid flow through scavenge passage 122. Valve member 132 moves between its restricted position and unrestricted position in response to pressure within bearing compartment 102, moving to its unrestricted position upon pressure decreasing within bearing compartment 102. Valve member 132 also moves between its restricted and unrestricted positions in response to differential pressure between the interior of bearing compartment 102 and the environment external to bearing compartment 102. This movement back-pressures bearing compartment 102 with respect to the environment external to bearing compartment 102. The movement can also be controlled such that the degree of restricted imposed by the valve is responsive to bearing compartment pressure for controlling pressure drop across the air inlet With reference to FIG. 4B and FIG. 4C, the effect of valve member 132 moving from its unrestricted to unrestricted position as shaft speed increases are shown. In the unrestricted portion of each graph, each of seal differential pressure and parasitic loss are well correlated to shaft speed.

Upon movement of valve member 132 to its restricted position, correlation between each of seal differential pressure and parasitic loss to shaft speed is broken. Both seal differential pressure and parasitic loss drop over a range in increasing shaft speed, e.g. exhibit inverse correlation, and thereafter return to correlation with shaft speed. Scavenging valve 130 has the technical effect of reducing the total indicated range of the parasitic loss exhibited by gas turbine engine 10 over the common range of shaft speed shown in FIG. 3C and FIG. 4C. For example, in regions A and C of the charts illustrated in FIGS. 4B and 4C each of seal differential pressure and parasitic loss are correlated to shaft (rotor) speed. In contrast, in region B of the charts each of seal differential pressure and parasitic loss are inversely correlated to shaft (rotor) speed.

Figure 5A:
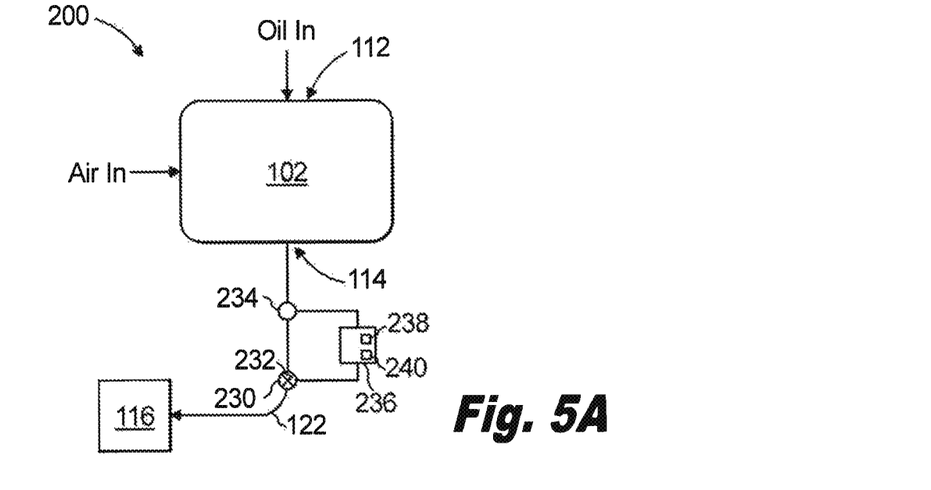
FIG. 5A is a schematic side view of a second embodiment of a scavenging system in accordance with the present disclosure, showing a continuously variable scavenging valve.

With reference to FIG. 5A, a lubrication system 200 is shown. Lubrication system 200 is similar to lubrication system 100, and additionally includes a continuously variable scavenging valve 230 with a valve member 232, a pressure sensor 234, and a control module 236. Pressure sensor 234 is connected between scavenge valve 230 and lubricant outlet 114 and is configured and adapted to sensor pressure within bearing compartment 102. Control module 236 is operatively connected to both pressure sensor 234 and scavenge valve 230, and is configured and adapted to configure the degree of restriction in scavenge valve 230 based on pressure sensed by pressure sensor 234. In the illustrated embodiment, valve member 232 moves continuously in response to seal differential pressure, thereby back-pressure bearing compartment 102 maintaining substantially uniform seal differential pressure.

Control module 236 includes a processor 238 operatively connected to a memory 240 having instructions recorded thereon. The instructions, when read by processor 238, cause controller 236 to undertake a actions including (a) determining pressure within bearing compartment 102, (b) comparing the determined pressure against a target bearing chamber pressure, and (c) changing the degree of restriction imposed within scavenge passage 122 by scavenge valve 232. Changing the degree of restriction can be through movement of a continuously variable position valve member arranged within a valve body of scavenge valve 232. Scavenge valve 232 can be tuned over a range of shaft (rotor) speeds such that control module 236 sets the degree of restriction to maintain substantially constant differential pressure between an interior of bearing chamber 102 and the environment external to bearing chamber 102. This can have the advantage of maintaining a substantially constant flow of lubricant through lubricant outlet 114 over a range of shaft (rotor) speeds that change the draw provided to scavenge passage 122 by lubricant scavenge pump 116.

Figure 5B:
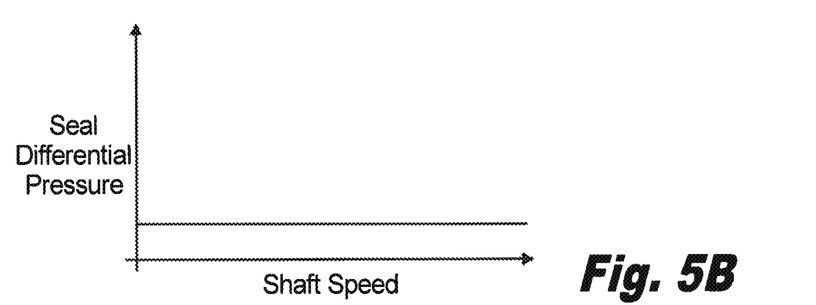
FIGS. 5B and 5C are graphs of seal differential pressure and parasitic loss versus shaft speed for the system of FIG. 5A, showing a constant relationship between each of differential pressure and parasitic loss over a range of rotor speeds, respectively.
Figure 5C:
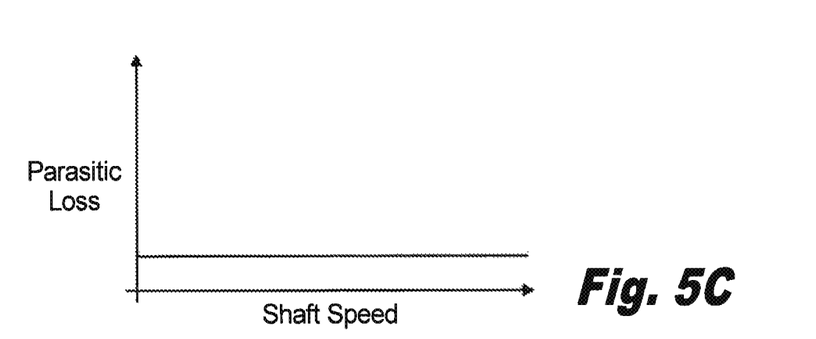

With reference to FIG. 5B and FIG. 5C, the effect of continuously variable scavenge valve 232 is illustrated. As shown in FIG. 5B, differential pressure across seals of bearing compartment 102 is substantially constant over the same range of shaft (rotor) speeds illustrated in FIG. 3B and FIG. 4B. Differential pressure is also uncorrelated to shaft (rotor) speed over substantially the entire range. Since parasitic losses across shaft seal 108 are a function of differential pressure, maintaining constant differential pressure provides consistent parasitic losses over the range of shaft (rotor) speeds. This is shown in FIG. 5C, wherein parasitic loss is correlated to differential pressure (shown in FIG. 5B) and uncorrelated to shaft (rotor) speed over the range of shaft speeds.

Sealing of bearing chambers is typically accomplished using either or both of contacting and non-contacting seals.

With certain types of seals, such as contacting seals, pressure differential across the seal is correlated to parasitic loss due to operational characteristics, such as friction due to the seal rubbing for example (which is driven by the load of the pressure differential imposed on the seal). Embodiments described herein which add a scavenge valve or a scavenge valve and pressure sensor can provide for regulation of differential pressure by control bearing chamber back pressure, such as from variable draw from devices like scavenging pumps for example. This can have the benefit of limiting the range of load imposed on the seal by pressure differential, potentially allowing for use of seal material and seal construction that would potentially be unsuitable in a conventional gas turbine engine, by reducing the peak pressure differential to which the seal would be exposed during operation. Embodiments having scavenge valves controlled over a continuous range such as with a control module using a control loop tuned to seal differential pressure for controlling valve member position can have similar benefits. Embodiments can also provide for reduced heat generation in bearing compartments arranged relatively close to high source pressures, such as bearing compartments located under the diffuser and/or combustor for example.

The methods and systems of the present disclosure, as described above and shown in the drawings, provide for gas turbine engines with superior properties including reduced parasitic losses at elevated rotor speeds. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A lubrication circuit for a gas turbine engine, comprising:
    a bearing compartment;
    an air inlet connected to the bearing compartment;
    a lubricant inlet and a lubricant outlet connected to the bearing compartment;
    a scavenge pump connected to the lubricant outlet; and
    a scavenge valve operatively connected between the lubricant outlet and the scavenge pump responsive to bearing compartment pressure for controlling pressure drop across the air inlet.

2. A lubrication circuit as recited in claim 1, wherein the scavenge valve includes a movable valve member for reducing fluid flow through the scavenge valve.

3. A lubrication circuit as recited in claim 1, wherein the scavenge valve includes a valve member movable between restricted and unrestricted positions in response to differential pressure between the bearing compartment and the bearing compartment external environment.

4. A lubrication circuit as recited in claim 2, wherein the scavenge valve is a continuously variable scavenge valve having a valve member configured and adapted to restrict fluid flow through the scavenge valve in response to differential pressure between the bearing compartment interior and the environment external to the bearing compartment.

5. A lubrication circuit as recited in claim 4, wherein the valve member is movable between first and second restricted positions, flow restriction being greater at the first restricted position than the second restricted position.

6. A lubrication circuit as recited in claim 4, further including a pressure sensor connected between the bearing compartment and the scavenge valve.

7. A lubrication circuit as recited in claim 6, further including a mechanical regulator operatively connected to the scavenge valve for controlling restriction in response to differential pressure between the bearing compartment interior and the bearing compartment external environment.

8. A lubrication circuit as recited in claim 6, further including a control module connected to the pressure sensor and the scavenge valve and configured and adapted to vary scavenge valve restriction based on sensed pressure.

9. A lubrication circuit as recited in claim 8, wherein the control module is tuned over a range of shaft speed to adjust restriction based on sensed pressure.

10. A lubrication circuit as recited in claim 1, wherein the air inlet is a shaft seal bounding the bearing compartment and separating the bearing compartment interior from the environment external to the bearing compartment.

11. A lubrication circuit as recited in claim 10, further including a spool rotatably supported by a bearing body disposed within the bearing compartment and having a rotatable portion sealably engaged by the shaft seal.

12. A lubrication circuit as recited in claim 11, wherein the spool is mechanically connected to the scavenge pump for driving the scavenge pump.

13. A lubrication circuit as recited in claim 11, wherein air flow through the air inlet is a function of rotational speed of the spool.

14. A lubrication system for a gas turbine engine, comprising:
    a bearing compartment;
    an air inlet connected to the bearing compartment;
    a lubricant inlet and a lubricant outlet connected to the bearing compartment;
    a scavenge pump connected to the lubricant outlet; and
    a scavenge valve operatively connected between the lubricant outlet and the scavenge pump responsive to bearing compartment pressure for controlling pressure drop across the air inlet, wherein the air inlet is a contacting shaft seal bounding the bearing compartment and separating the bearing compartment interior from the environment external to the bearing compartment; and
    a spool rotatably supported by a bearing body disposed within the bearing compartment and having a rotatable portion sealably engaged by the shaft seal, wherein the spool is mechanically connected to the scavenge pump for driving the scavenge pump such that air flow through the air inlet is a function of rotational speed of the spool.

15. A lubrication system as recited in claim 14, wherein the scavenge valve is a continuously variable scavenge valve having a valve member configured and adapted to restrict fluid flow through the scavenge valve in response to differential pressure between the bearing compartment interior and the environment external to the bearing compartment.

16. A lubrication system as recited in claim 15, wherein the valve member is movable between first and second restricted positions, flow restriction being greater at the first restricted position than the second restricted position.

17. A lubrication system as recited in claim 15, further including a pressure sensor connected between the bearing compartment and the scavenge valve.

18. A lubrication system as recited in claim 17, further including a mechanical regulator operatively connected to the scavenge valve for controlling restriction in response to differential pressure between the bearing compartment interior and the bearing compartment external environment.

19. A lubrication system as recited in claim 17, further including a control module connected to the pressure sensor and the scavenge valve and configured and adapted to vary scavenge valve restriction based on sensed pressure.

* * * * *